Aug. 7, 1962 W. A. HELSTEN 3,048,240
HANDBRAKE LINKAGE FOR ROTOR BRAKE
Filed July 24, 1959 2 Sheets-Sheet 1
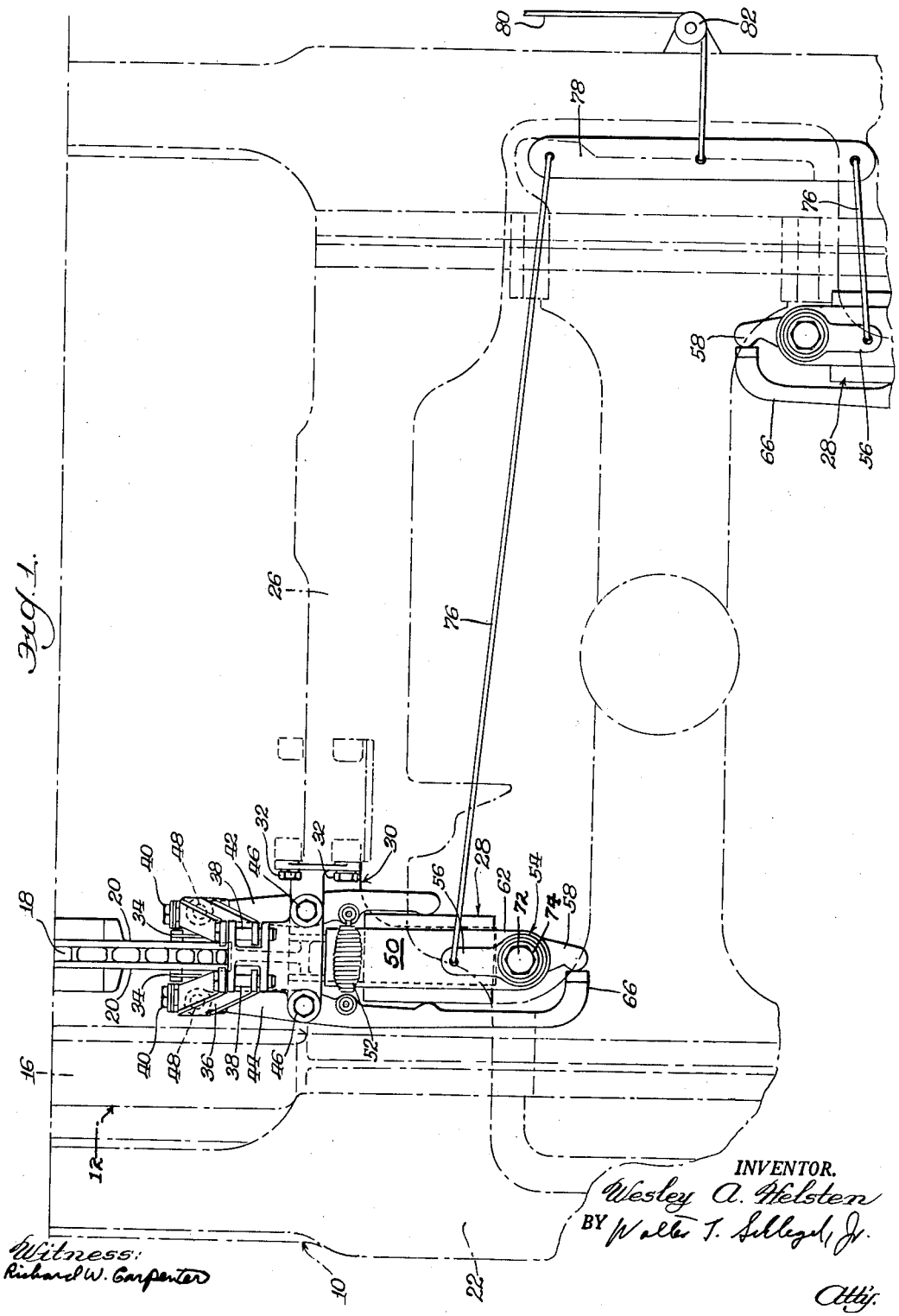
INVENTOR.
Wesley A. Helsten
BY Walter T. Schlegel, Jr.
Witness:
Richard W. Carpenter
Atty.

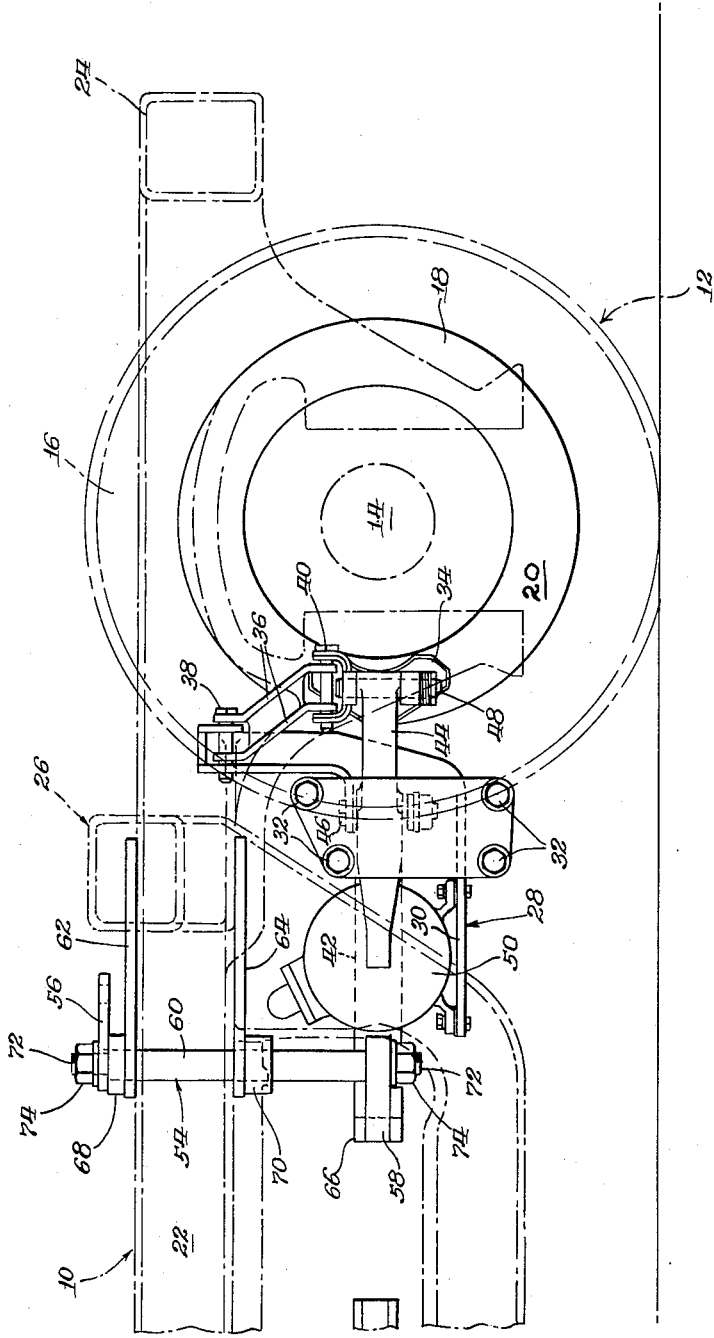

United States Patent Office 3,048,240
Patented Aug. 7, 1962

3,048,240
HANDBRAKE LINKAGE FOR ROTOR BRAKE
Wesley A. Helsten, Chicago, Ill., assignor to Amsted Industries Incorporated, Chicago, Ill., a corporation of New Jersey
Filed July 24, 1959, Ser. No. 829,364
3 Claims. (Cl. 188—46)

This invention relates to brake arrangements and more particularly to brake actuating linkage for railway vehicles.

The invention comprehends a novel handbrake linkage for railway vehicle rotor brake arrangements.

An important object of the invention is the provision of an improved linkage arrangement for manually actuating a railway vehicle rotor brake, which is compact and efficient so as to occupy a minimum amount of space.

A more specific object of the invention is to provide, in a handbrake linkage for a railway vehicle rotor brake arrangement, a handbrake lever which includes a pair of vertically spaced handbrake arms rigidly connected to a rotatable vertical shaft, one of the arms being operable to engage and actuate one of a pair of normally power actuated brake levers and the other of the arms being actuable by manual means.

These and other objects of the invention will be apparent from an examination of the following description and drawings, wherein:

FIGURE 1 is a fragmentary top plan view of a portion of a railway car truck to which has been applied a brake arrangement embodying features of the invention, only one of the two brake mechanisms on the truck being completely illustrated as they are similar to each other, and FIGURE 2 is a side elevational view of a portion of the structure illustrated in FIGURE 1.

It will be apparent that certain elements have been intentionally omitted from certain views where they are illustrated to better advantage in other views.

Referring now to the drawings for a better understanding of the invention, it will be seen that the novel handbrake linkage embodying features of the invention is shown associated with a rotor brake mechanism applied to a railway car truck which comprises a frame, indicated generally at 10, supported on a plurality of wheel and axle assemblies (only one of which is shown) indicated generally at 12.

The wheel and axle assembly 12 includes an axle 14 having secured thereto for rotation therewith a pair of wheels 16 (only one of which is shown) and a rotatable friction member or rotor 18 presenting a pair of oppositely facing axially spaced rotatable friction surfaces 20.

The frame preferably comprises a pair of longitudinally extending spaced side members 22 interconnected at their ends by a pair of transversely extending end rail members 24 (only one of which is shown) and interconnected intermediate their ends by a pair of transversely extending transom members 26 (only one of which is shown).

Disposed adjacent diagonally opposite corners of the truck are a pair of rotor brake mechanisms indicated generally at 28. Only one brake mechanism has been shown in its entirety, with just a portion of the other brake mechanism being shown, as the two brake mechanisms are similar to each other. Each brake mechanism 28 comprises a brake support 30 which may be detachably secured to the truck frame 10 adjacent its related rotor 18 by means of a plurality of bolts 32.

Deceleration of each wheel and axle assembly is achieved by a pair of brake shoe assemblies 34 disposed on opposite sides of the rotor for engagement with respective friction surfaces 20. Each brake shoe assembly 34 may be supported from brake support 30 by a pair of links 36 pivotally connected at their upper ends to the brake support by a pin 38 and pivotally connected at their lower ends to the brake shoe assembly by a pin 40.

The brake shoe assemblies are normally urged into engagement with their related rotor surfaces by a pair of inboard and outboard brake levers 42 and 44, respectively, which are fulcrumed intermediate their ends by pins 46 to brake support 30 for movement in a horizontal plane. At their outer ends, the brake levers may be pivotally connected to their related brake shoe assemblies by pivotal pins 48. The brake levers are preferably disposed on opposite sides of a duplex power cylinder 50 carried by the brake support 30 and having a pair of opposed pistons (not shown) disposed for engagement with the respective brake levers at points located inwardly of the fulcrum pins 46. If desired, the brake levers may be interconnected by a release spring 52, the opposite ends of which are connected to the respective levers at points located between the fulcrum pins 46 and the points at which the levers engage the respective pistons of the power cylinder 50.

Although the brake levers of each brake mechanism are normally actuated automatically by their respective power cylinders, it is also desirable to provide a handbrake linkage system for their manual actuation. In the conventional tread brake arrangements applied to standard railway car trucks, the addition of a handbrake linkage system for the manual actuation of the brake mechanisms does not present all the problems which are presented by the application of a handbrake linkage system to a rotor brake mechanism. The most important of these problems is that of space limitations which arise because the brake mechanisms are disposed entirely inboardly of the truck frame between the wheels. In order to actuate two different brake mechanisms on the same truck, it is necessary to provide some type of equalizing linkage, and this is difficult to do in a rotor brake arrangement where the brake mechanisms are located below the top of the truck frame. Accordingly, in this invention there is provided a novel means of raising the handbrake linkage actuating mechanism by providing each brake mechanism with a novel handbrake lever indicated generally at 54. Each handbrake lever 54, as best seen in FIGURE 2, comprises a pair vertically spaced of upper and lower handbrake arms 56 and 58, respectively, which are secured to a generally vertically disposed handbrake lever shaft 60, which in turn is mounted for rotation about a vertical axis in a pair of upper and lower support brackets 62 and 64, respectively carried by the frame. In order to position the shaft vertically so that the lower handbrake arm 58 is in proper vertical alignment with an extension 66, preferably formed integrally with the inner end of one of the power actuated brake levers, there may be provided on the shaft a spacer 68 and a shaft guide 70 disposed adjacent and above and below the upper and lower support brackets 62 and 64, respectively. The shaft may be provided at its opposite ends with threaded stud portions 72 which are disposed to extend through the upper and lower handbrake arms 56 and 58 and which may be secured thereto by nuts 74.

As best seen in FIGURE 1, in the brake mechanism at one side of the truck, the outboard brake lever 44 is provided with the extension 66 while in the brake mechanism at the other side of the truck the inboard brake lever 42 is provided with the extension 66, so that both levers may be actuated by forces pulling in the same direction. In FIGURE 1, it will be seen that the free ends of the upper hand brake arms 56 of each brake mechanism may be connected by cables or chains 76 to the opposite ends of a floating equalizer bar 78. The equalizer bar 78 may be actuated by means of another cable or chain 80 disposed to extend around a sheave or pulley 82 pivotally mounted on the truck frame 10 in a convenient location, so that a force exerted in a direction longitudinally of the truck by a handbrake wheel (not shown) mounted somewhere on the vehicle will exert transversely directed forces of equal amounts on the handbrake lever upper arms of the respective brake mechanisms 28 mounted on the truck. As best seen in FIGURE 2, it will be seen that the upper arm 56 of each hanbrake lever is disposed for rotation in a horizontal plane which is located above the brake mechanisms and also above all interfering portions of the truck frame 10, so that the upper arms together with the cables and the equalizer bar can all be operated in the same horizontal plane without danger of interfering with the other portions of the truck structure.

I claim:

1. In a handbrake arrangement for a railway car truck having a truck frame provided with side frame members supported at their ends upon two wheel and axle assemblies having friction members rotatable therewith, individual brake means provided for said assemblies, each brake means comprising a brake support mounted on the truck frame,
a brake lever pivotally mounted intermediate its ends on the brake support,
a brake shoe connected to one end of the brake lever for engagement against a friction member,
bearing brackets mounted on the truck frame,
a vertical shaft journaled in said bearing brackets,
upper and lower arms secured to said shaft, the lower arm engaging the other end of the brake lever to effect the engagement of the brakeshoe and the friction member,
common means to actuate the individual brake means comprising,
an equalizer bar,
cables connecting the upper arms to opposite ends of the equalizer bar,
and an actuating cable connected to the medial portion of the equalizer bar.

2. In a handbrake arrangement for a railway car truck having a truck frame provided with side frame members supported at their ends upon two wheel and axle assemblies having friction members rotatable therewith,
individual brake means provided for said assembles,
each brake means comprising a brake support mounted on the truck frame,
a brake lever pivotally mounted intermediate its ends on the brake support,
a brake shoe connected to one end of the brake lever for engagement against a friction member,
bearing brackets mounted on the truck frame,
a vertical shaft journaled in said bearing brackets,
upper and lower arms secured to said shaft, the lower arm engaging the other end of the brake lever to effect the engagement of the brake shoe and the friction member,
common means to actuate the individual brake means comprising,
an equalizer bar,
cables connecting the upper arms to opposite ends of the equalizer bar,
and an actuating cable connected to the medial portion of the equalizer bar,
said individual brake means being mounted at opposite sides of the truck frame and between the two wheel and axle assemblies.

3. In a handbrake arrangement for a railway car truck having a truck frame provided with side frame members supported at their ends upon two wheel and axle assemblies having friction members rotatable therewith, individual brake means provided for said assemblies,
each brake means comprising a brake support mounted on the truck frame,
a brake lever pivotally mounted intermediate its ends on the brake support,
a brake shoe connected to one end of the brake lever for engagement against a friction member,
bearing brackets mounted on the truck frame,
a vertical shaft journaled in said bearing brackets,
upper and lower arms secured to said shaft, the lower arm engaging the other end of the brake lever to effect the engagement of the brake shoe and the friction member,
common means to actuate the individual brake means comprising,
an equalizer bar,
cables connecting the upper arms to opposite ends of the equalizer bar,
and an actuating cable connected to the medial portion of the equalizer bar,
said individual brake means being mounted at opposite sides of the truck frame and between the two wheel and axle assemblies,
said brake levers being pivoted in opposite directions during application of the brake shoes against their respective friction members, whereby said assemblies are urged in a common direction toward one side of the truck frame.

References Cited in the file of this patent

UNITED STATES PATENTS

| | | |
|---|---|---|
| Re. 14,155 | Morton | June 20, 1916 |
| 2,011,411 | Kindler | Aug. 13, 1935 |
| 2,208,107 | Simanek | July 16, 1940 |
| 2,357,263 | Ledwinka | Aug. 29, 1944 |
| 2,413,614 | Eksergian | Dec. 31, 1946 |
| 2,877,871 | Tack | Mar. 17, 1959 |
| 2,890,767 | Tack | June 16, 1959 |

FOREIGN PATENTS

| | | |
|---|---|---|
| 281 | Great Britain | Feb. 1, 1859 |